(No Model.) 2 Sheets—Sheet 2.

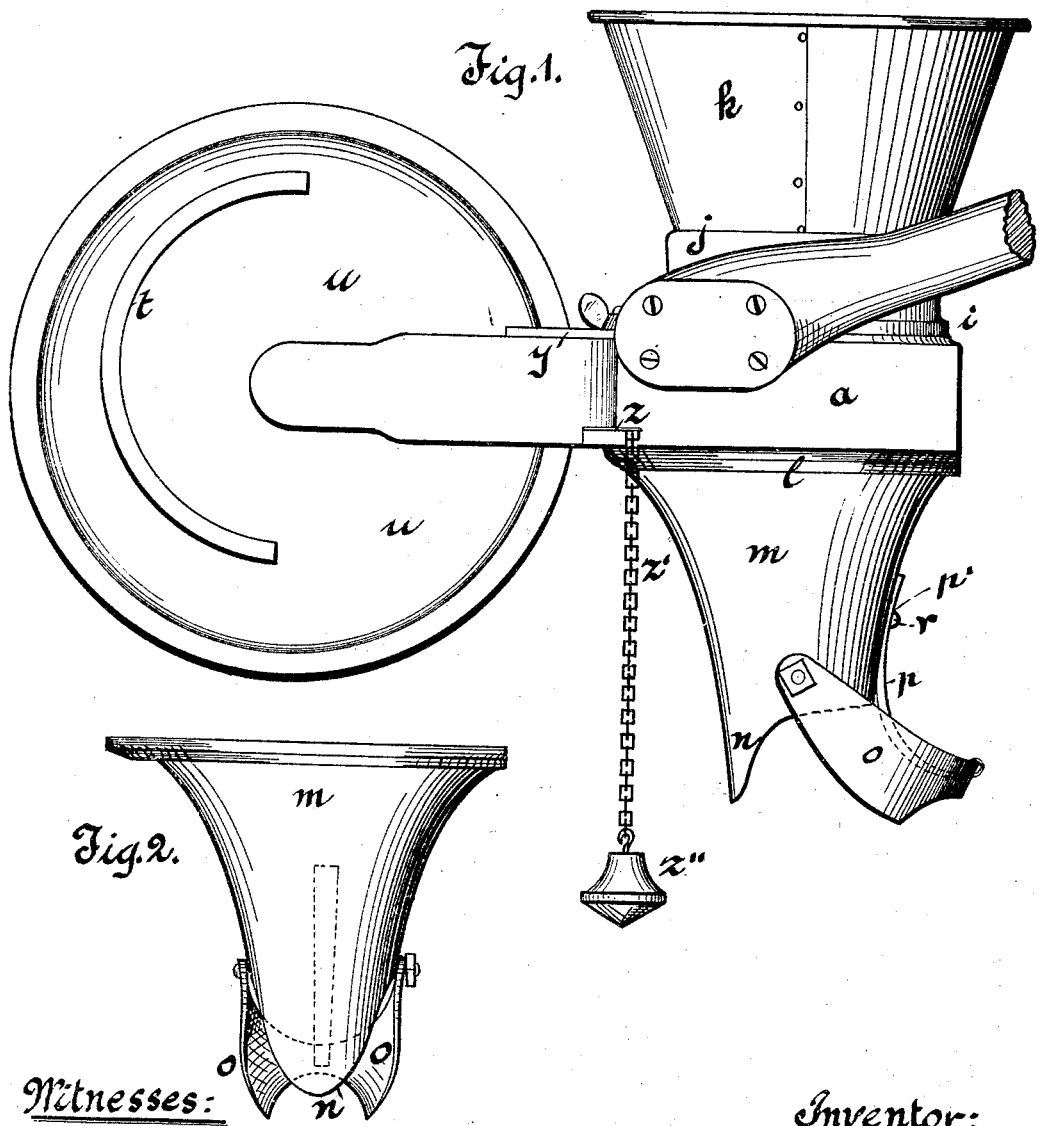

T. B. ROGERS.
Seed Sower.

No. 232,762. Patented Sept. 28, 1880.

Witnesses:
R. F. Gaylord
A. D. Smith

Inventor:
T. B. Rogers
By W. E. Simonds
Atty

UNITED STATES PATENT OFFICE.

THEODORE B. ROGERS, OF WETHERSFIELD, CONNECTICUT.

SEED-SOWER.

SPECIFICATION forming part of Letters Patent No. 232,762, dated September 28, 1880.

Application filed March 6, 1880. (No model.)

*To all whom it may concern:*

Be it known that I, THEODORE B. ROGERS, of Wethersfield, in the county of Hartford and State of Connecticut, have invented certain new and useful Improvements in Seed-Sowers, whereof the following is a description, reference being had to the accompanying drawings, where—

Figure 3:
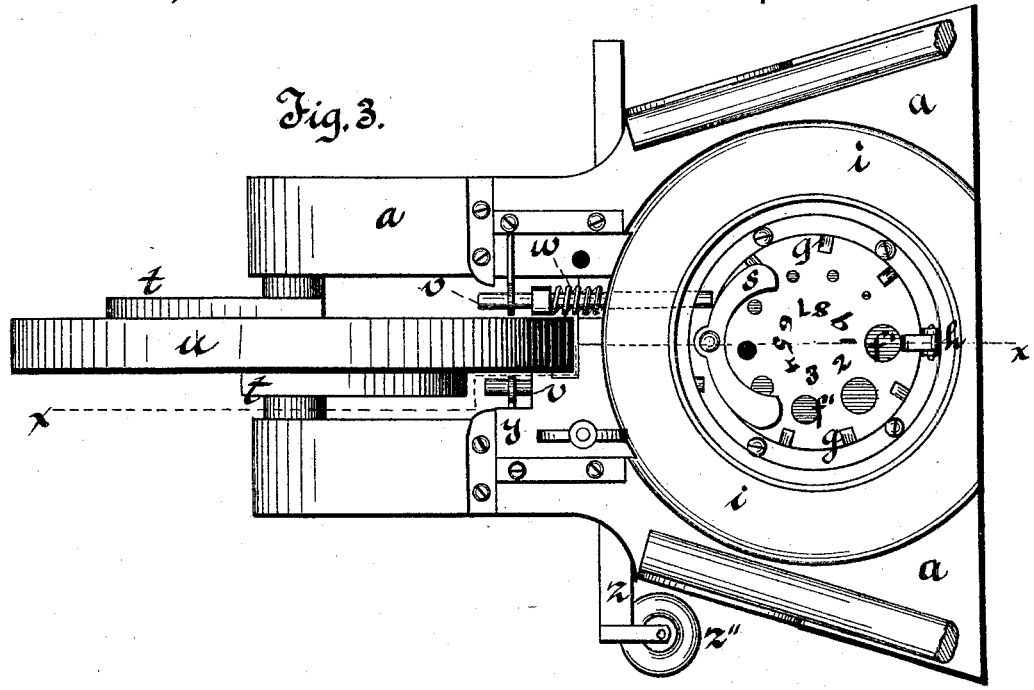
Figure 4:
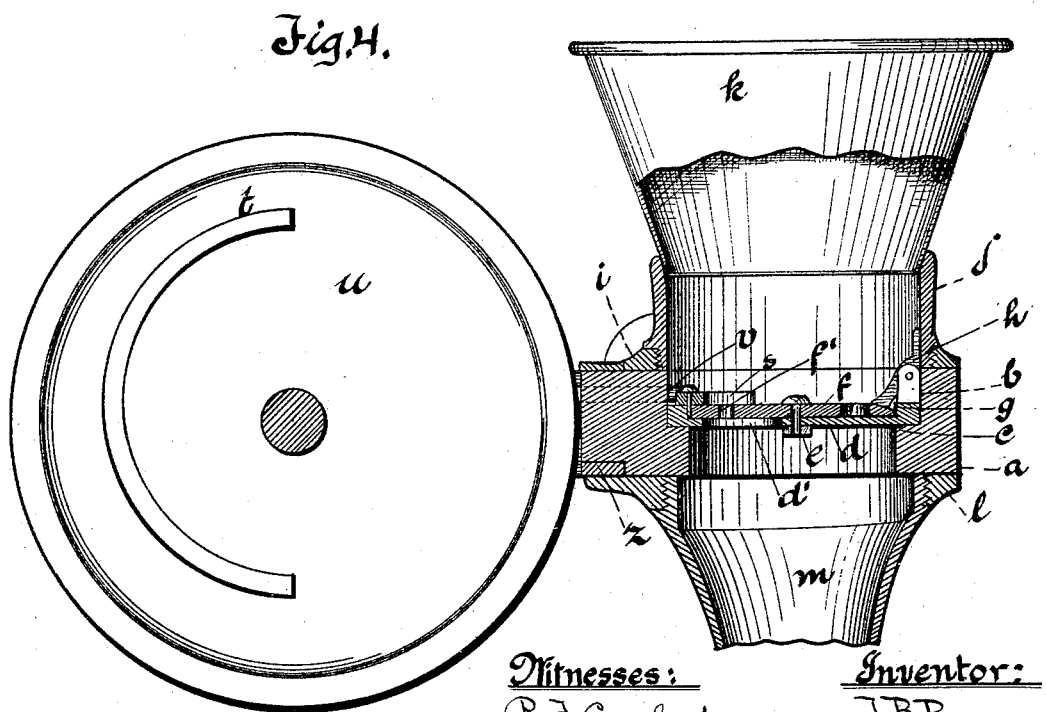

Figure 1 is a side view of the whole device, a portion of the handles excepted. Fig. 2 is a detail front view of the seed-spout. Fig. 3 is a top view of the device with a portion of the hopper cut off and one of the plates covering the actuating-rods removed. Fig. 4 is a view of hopper, seed-spout, and appurtenant parts in central vertical longitudinal section on plane $x\ x$, Fig. 3.

The letter $a$ denotes the (usually wooden) base or body to which the other parts are attached, pierced by a mortise, $b$, and provided therein with the shoulder $c$, on which shoulder the disk-bed $d$ is secured, the upper side of which is sunken or recessed by a circular depression, and bears therein, hung on a central pivot-pin, $e$, the rotary disk $f$, which is provided with a series of apertures, $f'\ f'$, &c., of different sizes, any one of which may be brought over and made to coincide with the seed-aperture $d'$, made in the disk-bed $d$. The seed from the hopper finds its way through that one of seed-apertures $f'$ which is over seed-aperture $d'$ to the seed-spout below, and thence to the ground. The seed-apertures $f'$ are made of different sizes to effect larger or smaller deliveries of seeds and to accommodate the device to seeds of larger or smaller size. This revolving disk bears (usually cast therein) figures 1 2 3, &c., respectively appurtenant to the different-sized seed-apertures, whereby to designate them, more especially to facilitate the giving of directions for their use.

The seed-disk $f$ is provided with a series of notches, $g$, and the disk-bed bears, pivotally hung (in a standard) thereon, a lever-catch, $h$, which will strike into any one of the notches $g$ and hold the disk from accidental rotation, there being one such notch for each one of the seed-apertures $f'$. The catch-lever may be itself locked in position by screwing the hopper into its seat, as hereinafter described.

The letter $i$ denotes the hopper-seat, fixed to the base $a$ and interiorly threaded, into which screws the hopper-base $j$, (usually a casting,) which hopper-base bears, riveted to it, the sheet-metal hopper $k$.

The letter $l$ denotes the seed-spout seat secured to the base $a$, and interiorly threaded. The letter $m$ denotes the seed-spout, exteriorly threaded near the top, and thereby screwing into the seat $l$.

The letter $n$ denotes a drill-opener appurtenant to the seed-spout, and $o$ denotes a drill-closer appurtenant to the seed-spout. As the drill-opener (and likewise the drill-closer) must, obviously, stand in a certain position for use, the feature of having the seed-spout seat fixed to the base and the seed-spout screw into the seat has an important practical relation to a drill-opener or a drill-closer (either or both) borne on the seed-spout, for in properly adjusting the parts at first the spout can be screwed home to its seat, and the seat then properly fixed to the base, and thereafter the drill-opener and the drill-closer will always come to the proper position when the spout is screwed home to its seat.

The drill-closer is not rigidly fixed to the seed-spout, but is pivoted thereon, so that its outer swinging extremity may be set higher or lower in adjustment, and thus act upon more or less of the soil.

An adjusting-rod, $p$, runs from the swinging end of the drill-closer up along the side of the seed-spout, and is there provided with holes $p'$, through one of which the set-screw $r$ runs into the seed-spout. By means of this screw and these holes the drill-closer may be fixed or locked in its adjustment.

On the disk-bed is pivotally hung the bifurcated agitator $s$, the seed-aperture in the disk-bed being between the forks thereof, and the movement of the forks of this agitator alternately toward and from such aperture is relied upon to effect the movement of the seed through the seed-apertures into the spout below.

The vibratory movement of this agitator is given by the eccentric cams $t\ t$, fixed to the sides of the wheel $u$, alternately acting on the actuating-rods $v\ v$, giving them longitudinal motion, which causes them to alternately strike the agitator at opposite sides of its pivot.

The retractile movement of the actuating-rods is given by springs $w$. These actuating-rods are covered from unnecessary exposure by plates $y$.

The letter $z$ denotes a marker-arm having lateral adjustment on the base $a$, provided at the outer end with chain $z'$ and drag $z''$.

I claim as my invention—

1. In combination, in a seed-sower, the bifurcated vibratory agitator $s$ and the seed-aperture $f'$, located between the forks of the agitator, substantially as described.

2. In combination, in a seed-sower, the bifurcated vibratory agitator $s$, the seed-aperture $f'$, located between the forks of the agitator, the actuating-rods $v$, and the cams $t$, borne on the wheel $u$, substantially as described.

3. In combination, in a seed-sower, the base $a$, the interiorly-threaded hopper-seat $i$, fixed to the base, and the hopper provided with a hopper-base, $j$, screwing into the hopper-seat, substantially as described.

4. In combination, in a seed-sower, the base $a$, the seed-spout seat $l$, fixed to the base, and the seed-spout $m$, screwing into the seat and bearing a drill opener or closer, substantially as described.

THEODORE B. ROGERS.

Witnesses:
R. F. GAYLORD,
W. E. SIMONDS.